(No Model.)
H. C. HART.
HAND RAKE.
No. 531,722.
Patented Jan. 1, 1895.
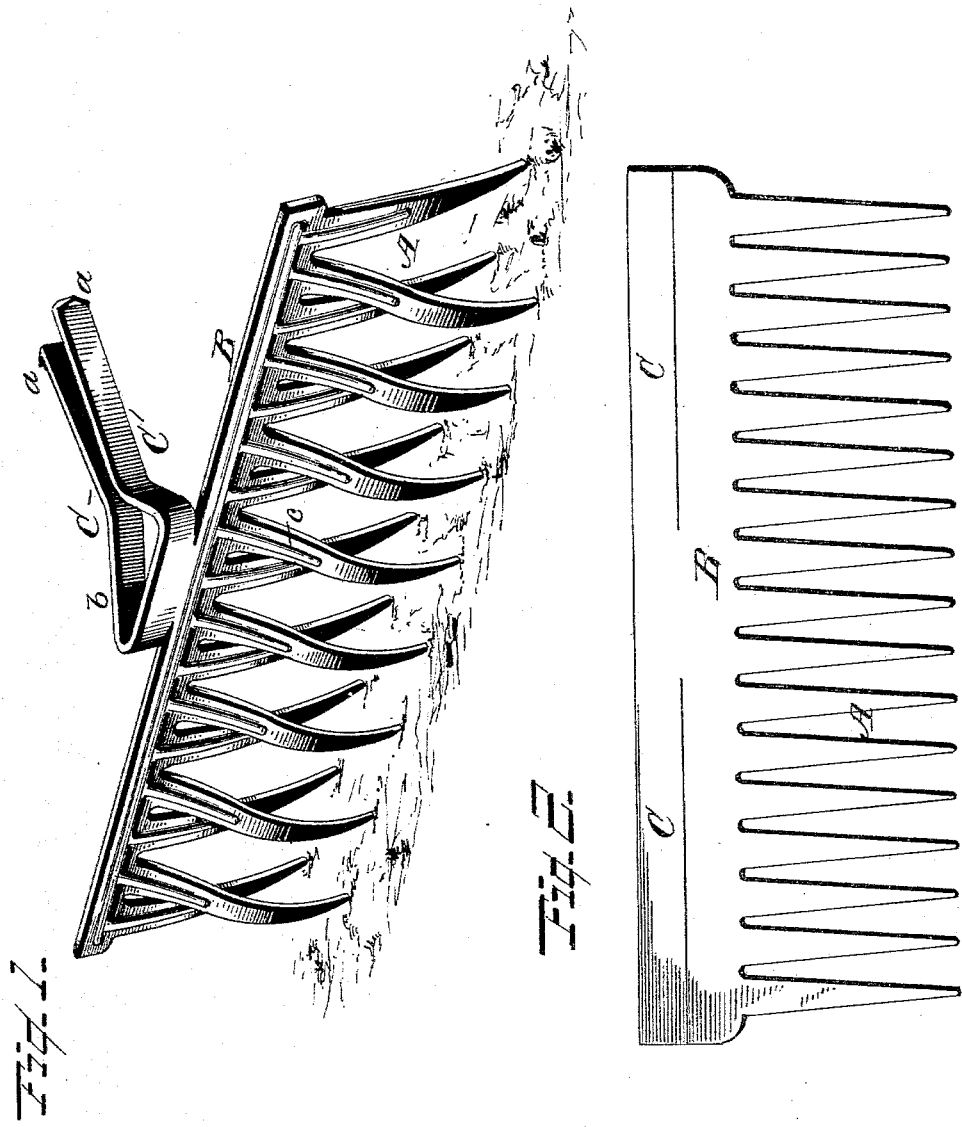
Witnesses
C. J. Williamson.
G. Goddard.
Inventor
Hubert C. Hart,
per Chd. H. Fowler,
Attorney.

UNITED STATES PATENT OFFICE.

HUBERT C. HART, OF UNIONVILLE, CONNECTICUT.

HAND-RAKE.

SPECIFICATION forming part of Letters Patent No. 531,722, dated January 1, 1895.

Application filed August 28, 1894. Serial No. 521,526. (No model.)

*To all whom it may concern:*

Be it known that I, HUBERT C. HART, a citizen of the United States, residing at Unionville, in the county of Hartford and State of Connecticut, have invented certain new and useful Improvements in Hand-Rakes; and I do hereby declare that the following is a full, clear, and exact description of the same, reference being had to the annexed drawings, making a part of this specification, and to the letters of reference marked thereon.

The object of the present invention is to materially improve the manufacture of hand or garden rakes whereby the rake may be produced at a greatly reduced cost and at the same time possess the necessary strength and durability and also arrange the teeth as will enable them to double their raking capacity. These several objects I attain by a rake constructed substantially as shown in the drawings and hereinafter described and claimed.

Figure 1 of the drawings represents a rake constructed in accordance with my invention and ready for attachment to the handle. Fig. 2 is a plan view of the rake after being stamped or cut from the sheet metal blank and previous to its being bent into shape as shown in Fig. 1.

In the accompanying drawings A represents the teeth; B, the back or head of the rake, and C the arms from which the shank is formed, these several parts of the rake being shown in Fig. 2 as being stamped or otherwise cut from a blank of sheet steel or other spring metal of any preferred thickness.

It is desirable for economy in the metal to have the blank of sufficient size to produce two rakes therefrom, the metal cut from the space in forming one line of teeth being utilized for the teeth of the other rake, two rakes thereby being produced from a single blank without the loss of material. After the rake has been stamped out from the blank as shown in Fig. 2, the arms C are bent into shape to form the shank of the rake and at the juncture of the head B and shank, the arms are bent to form a wide strengthening brace *b* to form a strong connection between the head of the rake and shank. Spurs *a* are formed upon the extremities of the arms C and extend laterally and outwardly so that when the arms are compressed and inserted in the handle and a wedge driven in between them, the arms will be expanded and the spurs embedded in the wood which will effectually hold the shank in place and prevent it from working loose. Any suitable form of shank may be used in place of that shown without departing from the principle of my invention.

If preferred the head of the rake and the teeth may be corrugated in any suitable manner in order to increase the strength of the rake, but this may be omitted in the manufacture of the rake if so desired without affecting the essential features of the invention.

After the rake teeth have been stamped or cut from the blank, they are bent to form a double row thereof, each alternate tooth being bent outward and curved as shown, each row of teeth being on different vertical and horizontal planes when the rake is in a vertical position, but when in a raking position which is on a slight incline, the points of both rows of teeth will come on the same horizontal plane and in contact with the ground, thereby enabling both rows of teeth to be brought into a working position for raking and thus increase the working capacity of the rake. This is considered one of the essential features of the invention for the reason that the raking capacity is multiplied and consequently its effectiveness increased in proportion.

When the rake is in use both rows of teeth are brought in action and what one row of teeth passes over the next row of teeth will take up.

Having now fully described my invention, what I claim as new, and desire to secure by Letters Patent, is—

A rake comprising a head and shank and two sets of teeth located upon different vertical and horizontal planes, said parts being formed from a single piece of metal, substantially as and for the purpose set forth.

In testimony that I claim the above I have hereunto subscribed my name in the presence of two witnesses.

HUBERT C. HART.

Witnesses:
EUGENE C. HEACOX,
H. A. COWLES.